United States Patent [19]

Haneda

[11] Patent Number: 5,585,789
[45] Date of Patent: Dec. 17, 1996

[54] DATA COMMUNICATION APPARATUS

[75] Inventor: Isamu Haneda, Soraku-gun, Japan

[73] Assignee: Sharp Kabushiki Kaisha, Japan

[21] Appl. No.: 54,069

[22] Filed: Apr. 29, 1993

[30]     Foreign Application Priority Data

May 11, 1992  [JP]  Japan ..................... 4-117572

[51] Int. Cl.$^6$ .............................. H04Q 7/00; G09G 5/00
[52] U.S. Cl. ................ 340/825.52; 340/825.07; 340/825.47; 340/825.54; 364/189; 345/169
[58] Field of Search ................. 340/825.52, 825.55, 340/825.2, 825.07, 825.44, 825.28, 825.29, 825.47, 825.69, 825.72, 825.53, 825.54, 310.02, 310.08; 364/188, 189; 345/168, 169; 235/375, 376, 385, 379; 379/91, 144, 216, 357, 456

[56]            References Cited

U.S. PATENT DOCUMENTS

| | | | |
|---|---|---|---|
| 4,430,639 | 2/1984 | Bennett | 340/825.54 |
| 4,755,792 | 7/1988 | Pezzolo et al. | 340/310.02 |
| 4,755,883 | 7/1988 | Uehira | 358/194.1 |
| 4,817,190 | 3/1989 | Comroe et al. | 340/825.52 |
| 4,818,987 | 4/1989 | Ide et al. | 340/825.47 |
| 4,845,491 | 7/1989 | Fascenda et al. | 340/825.47 |
| 4,873,519 | 10/1989 | Matai et al. | 340/825.47 |
| 4,941,203 | 7/1990 | Patsiokas et al. | 340/825.44 |
| 5,221,838 | 6/1993 | Gutman et al. | 235/379 |
| 5,274,454 | 12/1993 | Higgins, Jr. | 340/825.44 |

*Primary Examiner*—Michael Horabik
*Assistant Examiner*—Edward Merz
*Attorney, Agent, or Firm*—Nixon & Vanderhye

[57]            ABSTRACT

A data communication apparatus has a RAM for storing address information concerning a plurality of destinations (e.g., data for telephone directory, name card management, or the like), and the owner data characterizing the apparatus. When optical communication is selected from a keyboard, an LCD display is provided to select either transmission or reception. When the transmission is selected, several modes are selectable including unconditional communication, wild communication, and destination designated communication. When the destination designated communication is selected, the destination list is displayed by the LCD. When the destination is designated by the "name," the completion of reception is confirmed. Plural destinations can also be designated. When the wild communication is selected, the data is transmitted to unspecified destinations and is confirmed. Thus, destinations of data communication can be easily and flexibly designated.

49 Claims, 6 Drawing Sheets

<OPTICAL COMMUNICATION>

SELECT TRANSMISSION
OR RECEPTION

1. TRANSMISSION

2. RECEPTION

<OPTICAL COMMUNICATION TRANSMISSION>

SELECT TRANSMISSION TYPE

1. UNCONDITIONAL COMMUNICATION

2. WILD COMMUNICATION

3. DESTINATION DESIGNATED COMMUNICATION

FIG. 5(1)

<DESTINATION LIST>

1  MR. MOTO, MANAGER
2  OA SHOP
3  3276
4  MR. KAZU FUJI
5  SALES SECTION
6  MR. NAGA, DIRECTOR
7  MR. ICHI YAMA
8  MR. DEN
9  [INPUT]  0  [DELETE]

FIG. 5(2)

<DESTINATION ADDRESS>

[NAME]
[COMPANY NAME]
[SECTION]
[POSITION]
[TELEPHONE NUMBER]
[ID NUMBER]

FIG. 5(3)

ENTER NUMBER OF
ADDRESS INFORMATION
TO BE DELETED.

1  MR. MOTO,
2  OA SHOP
3  3276
4  MR. KAZU FUJI
5  SALES SECTION
6  MR. NAGA, DIRECTOR
7  MR. ICHI YAMA
8  MR. DEN

FIG. 6(1)

| STX | TYPE = 21h | DATA | EXT = 03h |
|---|---|---|---|

FIG. 6(2)

| STX | TYPE = 22h | DATA | EXT = 03h |
|---|---|---|---|

FIG. 6(3)

| STX | TYPE = 23h | ADDRESS INFORMATION | DATA | EXT = 03h |
|---|---|---|---|---|

FIG. 7

| | |
|---|---|
| 31h | NAME DATA <0 0 h> |
| 32h | COMPANY NAME DATA <0 0 h> |
| 33h | SECTION DATA <0 0 h> |
| 34h | POSITION DATA <0 0 h> |
| 35h | TELEPHONE NUMBER DATA <0 0 h> |
| 36h | I D NUMBER DATA <0 0 h> |

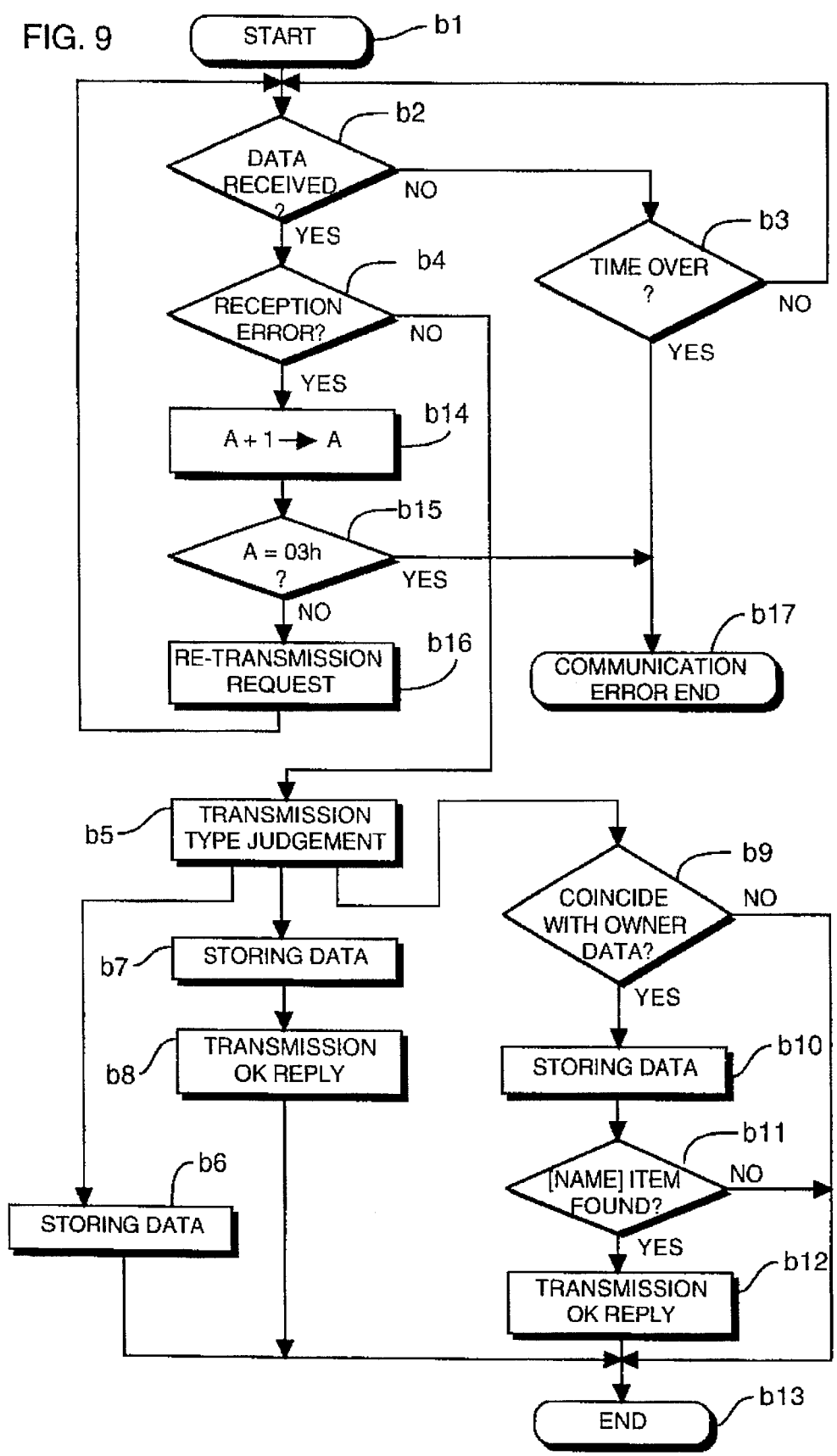

DATA COMMUNICATION APPARATUS

BACKGROUND OF THE INVENTION

1. Field of the Invention

The present invention relates to a data communication apparatus such as a portable information terminal device for wireless radio data communication through light or radio wave.

2. Description of the Related Art

Conventionally, some portable information terminal devices (such as a so-called electronic pocket diary, simplified word processor or personal computer) possess a wireless data communication function utilizing light such as infrared and radio wave. For data communications generally, wire communication networks are used, requiring a connector with a specific size for connection with wire communication networks. Since the portable information terminal unit is designed to be of small size and light weight, a relatively large connector is not desirable. By wireless communication using light or wireless wave, data communications may be achieved without sacrificing the portability of the portable information terminal device.

Between plural portable information terminal devices with data communication capability by the conventional wireless communication, mutual data communications are also possible. In data communications using light, only the data to be transmitted is sent from the transmission side, and it is arranged to receive the data directly at the reception side. In data communications using radio wave, by designating the destination of communication, it is arranged to Send the data to the designated destination.

In conventional data communications by light, the data from the transmission side can be received by all reception sides within the light reaching range, so that data communications to aim only at a specific reception side device is impossible. Accordingly, even if the content of confidential data must be kept secret, the data is able to be received by other reception side devices, so that it is impossible to transmit secret data. In data communications using radio wave, data communication is executed by designation of destination. Accordingly, it is easy to transmit secret data only to the designated destination, but flexible designation as designating plural destinations and transmitting them is available.

Prior art communication from a portable electronic device to another specific device using radio wave is disclosed, for example, in the Japanese Laid-open Patent Hei. 3-296329. This prior art relates to a radio individual calling system such as pager. The purpose of communication is, however, to confirm operation of the radio device for calling, but not to communicate data. Besides, for controlling selection of the destination of communication, a control device is needed aside from the radio device for calling.

Moreover, the data process and communications in the portable information terminal device require completely independent operations. Accordingly, if the data for designating the destination is already included in the stored data, it is necessary to newly enter the data in the operation for designating the destination.

SUMMARY OF THE INVENTION

It is hence an object of the invention to provide a data communication apparatus capable of designating a destination partner for data communication with ease and flexibly.

To achieve the object, the invention provides a data communication apparatus comprising:

communication means for transmitting data and for receiving data by wireless communication, a memory for storing data, input means for entering data and data processing information, and processing means, according to the data processing information entered ill the input means, for activating for processing the data stored in the memory, and for activating the communication means to transmit data, the processing means being able to add at least a part of the data stored in the memory to the data to be transmitted as destination data.

In the preferred embodiment of the invention, when predetermined destination data is received by the communication means, the processing means executes a process to receive data to which the destination data is added.

In the preferred embodiment of the invention the processing means, data also can be received without additional destination data.

In the preferred embodiment of the invention the processing means is able to add destination data designating a plurality of destinations to the data transmitted from the communication means.

In the preferred embodiment of the invention the processing means is provided with a reception confirmation function, in data transmission, for instructing the destination to reply completion signal informing the completion of reception, and for waiting reply by the completion signal after data transmission, and in data reception, for replying the completion signal after completion of data reception when it is instructed to reply the signal.

In the preferred embodiment of the invention the communication means performs the wireless communication by using light signal.

In the preferred of the invention embodiment the communication means further comprises display means.

The processing means displays the data stored in the memory by the display means, according to the processing information entered in the input means, and making the data including the displayed data to be transmitted from the communication means.

In the preferred embodiment of the invention the processing means selects the destination data, according to the input entered into the input means, out of the data displayed by the display means.

The invention further provides a data communication apparatus for transmitting data from transmission side apparatus to reception side apparatus by wireless communications, in which:

the transmission side apparatus comprises;

destination memory means for storing one or plural related destination data for every reception side apparatus, destination display means for displaying at least a part of the destination data stored in the destination memory means as the destination, destination selection means for selecting the destination displayed by the destination display means, and transmission means for reading out the destination data including the destination selected by the destination selection means from the destination memory means, and for transmitting the destination data together with the data to be transmitted, and the reception side apparatus comprises;

select data memory means for storing the select data predetermined for each reception side apparatus, destination data detecting means for receiving data from the transmission side apparatus, and for detecting whether destination data is included in the received data or not, and reception means, in response to the output from the destination data detecting means, when destination data is included in the received data, destination data for receiving the data only when the data destination data is matched with the selected data, and, for when destination data is not included in the received data, continuing to receive the data.

According to the invention, the data communication apparatus comprises communication means, memory, input means and processing means. The processing means processes the data stored in the memory according to the input data processing information. Data is transmitted from the communication means, and at least a part of the data stored in the memory is able to be added as destination data to the data to be transmitted.

Thus, according to the invention, the destination of the partner of data communication is able to be designated by using already stored data.

In the preferred embodiment, the data added with the predetermined destination data is received. As a result, only the destination designated from the transmission side is able to receive the data. The other parties do not use the data, so that secret data communication is possible. Moreover, the not designated parties do not have to receive unnecessary data, and the storage capacity of the buffer memory is able to be utilized effectively.

In the preferred embodiment, unless the destination data is added to the data to be transmitted, the data is able to transmit unconditionally to undesignated parties. Accordingly, whether addition of destination data or not, the flexible designation of destinations is possible.

Also in the preferred embodiment, data communication by designating plural destinations is possible. Hence, quick data communication with parties in any desired scope can be achieved.

According to the preferred embodiment, it is possible to instruct the destination to reply the completion of the reception in transmitting data. By confirming the reply upon completion of data reception, data communication can be achieved securely.

According to the preferred embodiment, since radio communication is performed by light signal, the communication means may be composed in a small size and light weight.

According to the preferred embodiment display means is further comprised. The displayed data is included in the transmission data, so that the data to be transmitted can be easily confirmed.

According to the preferred embodiment the destination data can be selected out of the data displayed by the display means. Therefore, the destination can be easily and quickly designated.

According to the invention, data is transmitted from the transmission side apparatus to plural reception side apparatuses by wireless communication. The transmission side apparatus comprises destination memory means, destination display means, destination selection means and transmission means. Each reception side apparatus comprises select data memory means, destination data detecting means, and reception means. In the destination memory means of the transmission side apparatus, one or plural related destination data are stored for every reception side apparatus. In the select data memory means of each reception side apparatus, predetermined select data for every reception side apparatus is stored. The destination selection means selects destination from at least a part of the destination data displayed as destination by the destination display means. The destination data including the selected destination is transmitted together with the data to be transmitted by the transmission means. Destination data detecting means of the reception side apparatus detects whether the destination data is included or not in the data received from the transmission side apparatus. The reception means, in case the destination data is included, receives the data only when the destination data coincides with the select data, and continues to receive data while the destination data is not included in the received data. The destination may be designated only by selecting the destination displayed by the destination display means, so that the designation is easy. Since the data is transmitted from the transmission side apparatus to the reception side apparatus in which the destination data coincides with the select data, when the same select data are stored in plural reception side apparatuses, the data can be transmitted simultaneously from one transmission side apparatus. Besides, when the transmission side apparatus transmits the data without destination data, the data can be received by all reception side apparatuses. Thus, flexible designation can be achieved.

According to the invention, only by selecting the destination displayed by the destination display means the destination may be easily designated and the data can be communicated from the transmission side apparatus. The destination data including the selected destination is transmitted together with the data to be transmitted from the transmission side apparatus. At the reception side apparatus, in case destination data is not included in the received data, the data may be received continuously, and in case the destination data is included, the data can be received only when it coincides with the select data. Therefore, the destination can be designated flexibly, depending on presence or absence of designation of the destination and on storing manner of the destination data and the select data.

Since the destination can be designated easily and flexibly, it may be possible to prevent from sending data to undesired reception side apparatuses, and secret data communication is enabled. In the portable information terminal device or the like, since it is necessary to compose in a small size and light weight, the memory capacity of the buffer for data communication is limited. At the reception side apparatus, if undesired data is received and stored in the buffer, when desired data is received, it may not be stored in the buffer, but since the receiving data can be selected, such shortcoming may be prevented.

BRIEF DESCRIPTION OF THE DRAWINGS

Other and further objects, features, and advantages of the invention will be more explicit from the following detailed description taken with reference to the drawings wherein:

FIG. 5 (1)(2)(3) are views depicting display screens of an LCD 9 shown in FIG. 1.

FIG. 6 (1)(2)(3) is a diagram showing a format of transmission data in the embodiment shown in FIG. 1.

FIG. 7 is a diagram showing a format of address information in the data to be transmitted in the embodiment shown in FIG. 1.

FIG. 9 is a flow chart showing receiving operation in the embodiment shown in FIG. 1.

DETAILED DESCRIPTION OF THE PREFERRED EMBODIMENT

Figure 1:
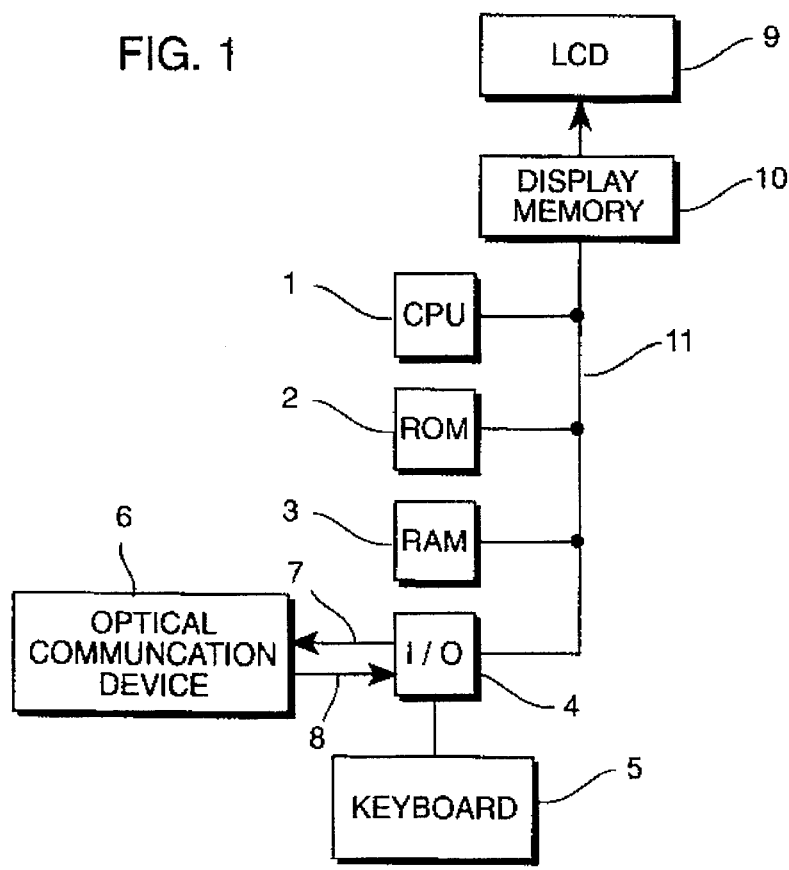
FIG. 1 is a block diagram showing a schematic electric configuration of a data communication apparatus according to an embodiment of the invention.

Now referring to the drawing, preferred embodiments of the invention are described below.

FIG. 1 shows a schematic electrical configuration of an embodiment of the invention. A central processing unit (hereafter abbreviated 'CPU') 1, also known as processing means, controls the operation of the data communication apparatus according to a program written in a read-only memory (hereafter abbreviated to 'ROM') 2. A random access memory (hereafter abbreviated to 'RAM') 3 is used as the memory means for destination data or select data, in particular, as a storing place for data and for a work area when the CPU 1 operates according to the program stored in the ROM 2. An integrated circuit input and output device (hereafter abbreviated to 'I/O') 4 is connected to system bus 11, through which the CPU 1 is able to control the output and input. A keyboard 5 is an input means as destination select means connected to the I/O 4. As such input means, a so-called pen coordinates input device or the like may be used. The CPU1 is able to detect which key of the keyboard 5 has been pressed according to the signal from the I/O 4. An optical communication device 6 is connected as communication means to the I/O 4 through an output line 7 and an input line 8. The optical communication device 6 modulates an output signal provided through the output line 7, converts the signal into a light signal, and (functioning as transmission means) transmits the light signal. When a light signal is received, the optical communication device 6 operates as the reception means, then demodulates the signal, converts it into an electrical input signal, and applies it to the I/O 4 through the input line 8.

A liquid crystal device (hereafter abbreviated to 'LCD') 9, as display means, displays image representing information stored in a display memory 10. The CPU 1, ROM 2, RAM 3, I/O 4 and display memory 10 are mutually connected through system bus 11.

The CPU 1, when transmitting data including message data and the like, writes the transmission data to the I/O 4 as parallel data. The I/O 4 converts the written parallel data into a serial signal, and applies it to the optical communication device 6 through the transmission output line 7. The optical communication device 6 transmits the optical output modulated by the serial signal. When an optical signal is received by the optical communication device 6, the I/O 4 interrupts the CPU 1. When the CPU 1 is interrupted resulting from optical signal reception, the CPU 1 reads the input data from the I/O 4, and stores the data in the RAM 3. When the data is received continuously, it is sequentially stored in the RAM 3.

Figure 2:
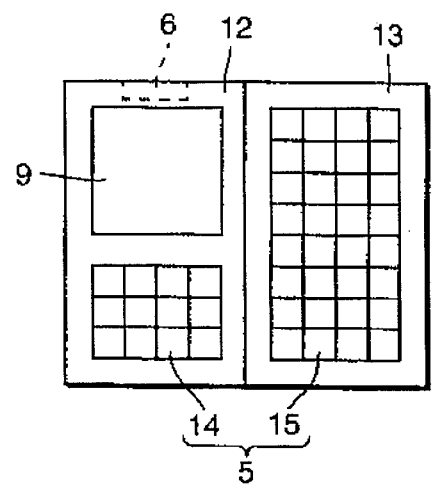
FIG. 2 is a front view showing an appearance of the data communication apparatus of the embodiment shown in FIG. 1.

FIG. 2 shows the appearance of the data communication apparatus shown in FIG. 1. The CPU 1, ROM 2, RAM 3, I/O 4, optical communication device 6, LCD 9 and display memory 10 shown in FIG. 1 are installed in a main body 12 side as shown in FIG. 2. A cover 13, capable of being opened and closed, is mounted to the main body 12. The keyboard shown 5 in FIG. 1 is provided both on the main body 12 and cover 13 as main body side keys 14 and cover side keys 15, respectively. Such main body 12 and cover 13 constitutes a so-called electronic pocket diary system. When the cover 13 shown in FIG. 2 is open, the apparatus is arranged to utilize the keyboard 5 and to read the display on the LCD 9 as easily as possible. When the cover 13 is closed, the apparatus is small in size and suited to portable use.

Figures 3, 4:
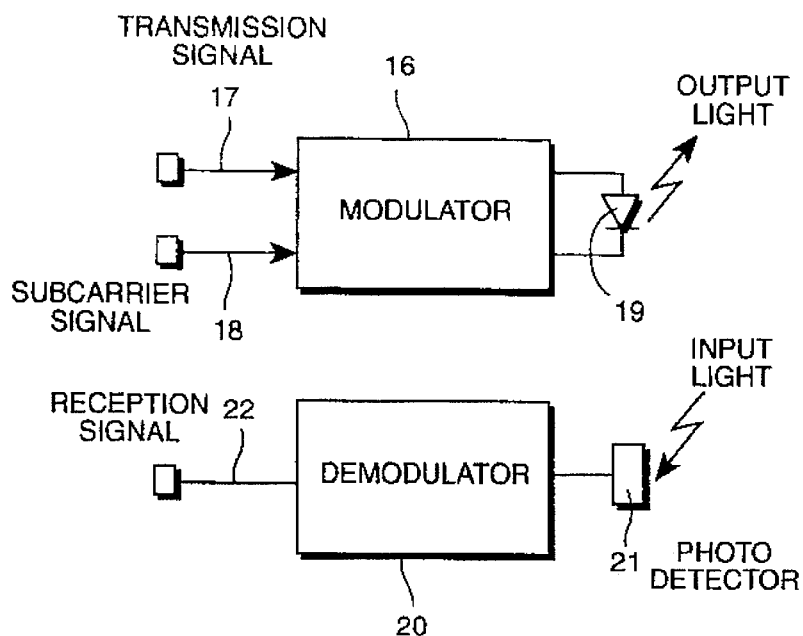
FIG. 3 is a block diagram showing a schematic electric configuration of an optical communication device 6 in the embodiment shown in FIG. 1.
FIG. 4 (1)(2) are views depicting display screens of an LCD 9 shown in FIG. 1.

FIG. 3 shows the internal composition of the optical communication device 6 shown in FIG. 1. To a modulator 16, a transmission signal 17 and a subcarrier signal 18 are applied through the output line 7 shown in FIG. 1. The transmission signal 17 is a serial signal possessing a specific signal transmission speed. The subcarrier signal 18 possesses a frequency of 5 to 10 times (or more) faster than the transmission signal 17. The modulator 16 transports the transmission signal 17 on the subcarrier signal 18, and transmits them as output light from a light emitting device 19 such as light emitting diode (abbreviated to LED). It is intended to transport the transmission signal 17 on the subcarrier signal 18 so that optical communication is possible even over long distances. That is, when the transmission signal 17 is a Logically "1", a current flows through the light emitting device 19 and light is emitted. This light is repeatedly turned on and off by the subcarrier signal 18. Only when this intermittent frequency coincides with the subcarrier frequency, the light signal is selected and amplified, so that the noise effect may be reduced. When the transmission signal 17 is a logically "0", the light emitting device 19 does not emit light.

A demodulator 20 demodulates its output when the input light is received by a photo detector 21 such as photo transistor or photo diode. If the subcarrier signal is contained in the input light, it is determined to be an output light from another optical communication device 6, and accordingly a reception signal is given to the I/O 4 through the input line 8 (shown in FIG. 1 as reception signal 22). If the subcarrier signal is not contained in the received light, it is determined not to be input light for data communication.

FIGS. 4 (1) and 4 (2) and FIG. 5 (1) through 5 (3) show displayed information on the LCD 9, which is the destination display means for data communication according to the illustrated embodiment. FIG. 4 (1) shows a screen display state appearing after a key for instructing optical communication is pressed. In this state, when the numerical key "1" is pressed on the keyboard 5, "transmission" is selected, when key "2" is pressed, "reception" is selected. FIG. 4 (2) shows a screen display state when transmission is selected. By pressing key "1", the "unconditional communication" is selected, and the transmission side transmits data and then terminates the transmission. There is no confirmation whether the reception side has received the data or not. In this mode of use, even if there are plural receivers, data communication is possible.

When key "2" is pressed, i.e., "wild communication" is selected, any reception side apparatus is eligible to receive. The reception side apparatus, after termination of the transmission, transmits confirmation data informing of the completion of reception. The transmission side apparatus receives the confirmatory reply from the reception side, and thus recognizes the completion of reception. If no confirmation is received, or if the reply data has some error, the data is retransmitted. Re-transmission is retried up to two times.

By pressing key "3", the "destination designation communication" is selected, and then the data is transmitted only to the designated destination.

FIGS. 5 (1)–5 (3) shows display state screens relating to the destination. FIG. 5 (1) show a destination list display which appears when key "3" is pressed in FIG. 4 (2). As the destination list, already-registered destinations are displayed. In this embodiment, up to eight cases can be registered. By pressing any one of numeric keys 1 to 8, the destination address, which is the destination data corresponding to the key, and the data which is to be transmitted, are transmitted in pair.

By selecting numeral 9 in FIG. 5 (1), the screen display shown in FIG. 5 (2) for input of a new destination address appears. By selecting numeral 0 in FIG. 5 (1), the screen display for deleting the registered address information as shown in FIG. 5 (3) appears. In the illustrated embodiment, up to eight cases can be registered, so that new address information cannot be registered unless any previously registered address information is deleted (assuming all eight destination addresses have been already registered). Such capacity limitation is dependent upon the display screen size of the LCD 9 for the portable information terminal device. If less than eight destination addresses are registered, the destination address information entered in the state of FIG. 5 (2) is registered automatically. As for a destination not previously registered, the address information is entered in the state as shown in FIG. 5 (2). Therefore, the destinations to which transmission is possible are not limited to the eight cases only.

When entering the destination address in FIG. 5 (2), up to six input items are displayed, but it is not necessary to enter data in all items. In data transmission, data relating to a lacking input item is not transmitted. The reception side also does not check such data. In the destination list display in FIG. 5 (1), if data is entered in plural items, only the top item is displayed.

The "name" is the item for designating a specific person (assuming no plural destinations). When the reception side apparatus receives data, a confirmatory reply is returned to the transmission side apparatus, and the data communication is terminated. If an item other than the "name" is designated, the reception side apparatuses may be plural, and the transmission side apparatus terminates the data communication after transmitting the data. The reception side apparatus monitors the transmitted address information, and when judged to be eligible to receive, the transmitted data is received, and then the reception is terminated. At the reception side apparatus, if the "name" item is not found in the transmitted data, the reception is terminated without replying. Input for each item of "name", "company name", "section", "position", "telephone number" and "ID number" is treated as a one line character string.

When the reception side apparatus determines whether or not to receive the data, the determination is based on owner data stored in the device. That is, the owner data is the select data, and the same type of items as in FIG. 5 (2) are stored. When receiving, the transmitted address information and the owner data are compared. When each item of the transmitted address information coincides with each item of the owner data, reception eligibility is determined. Otherwise, there is no reception. Coincidence must occur for all transmitted items, because it is possible to receive only when all items are matched. When all items are matched, and when the item of "name" is found in the transmitted address information, it is determined to be 1:1 communication. Accordingly, after receiving one case of data, the confirmatory reply of "reception completion" is returned. If a reception error occurs, the reply of "reception error" is returned. At this time, the transmission side re-transmits the data.

In the transmission side apparatus, when the item of "name" is designated in the address information, it is also determined to be 1:1 communication. In the absence of "name" item, it is also determined to be 1:n communication.

When deleting the registered address information in FIG. 5 (3), any one of numerals 1 to 8 is selected. When a number is selected, the corresponding address information is deleted. If there is any address information with a greater number than the deleted number, the address information with the subsequent numbers are shifted to the position by one number. When deletion processing of the address information is over, the screen returns to the display state in FIG. 5 (1).

FIGS. 6 (1)–6 (3) show format of data in transmission. FIG. 6 (1) shows the format for 1:n communication when the unconditional communication is selected in FIG. 4 (2). FIG. 6 (2) shows the format of 1:n communication when the "wild communication" is selected in FIG. 4 (2). FIG. 6 (3) shows the address format for 1:1 communication with the address function added when the destination designation is selected in FIG. 4 (2). In each format, the "STX" code is attached to the beginning of the data. The "STX" code is a two-digit hexadecimal number "02h" (hereinafter the hexadecimal notation is represented by the suffix "h")". What distinguishes the three types of communication is the "TYPE" code which follows the "STX" code.

When the "TYPE" code is "21h" or "22h", the unconditional communication or the wild communication is indicated respectively. In these cases, the address information is not added, and only the data for 1:n communication is given. Finally "00h" is transmitted as "ETX" code, and data transmission is terminated. When the "TYPE" code is "23h" indicating the destination designated communication, the address information in addition to the data is transmitted.

FIG. 7 shows the content of the address information shown in FIG. 6 (3). The items of the address information sent from the transmission side are "31h" to "36h" as "item name discrimination codes", representing "name", "company name", "section", "position", "telephone number", and "ID (identification) number", respectively. In succession to the item name discrimination code, the item data defining the content of each item is sent. In the final place of the item data, the null code "00h" is added to define the end of each item data. Next, the code "30h" is attached, then the data to be transmitted follows. The address information, registered at the transmission side, is stored in the format as is mentioned above, the "item name discrimination code" is attached before each item, and finally "30h" code is attached. By transmitting these codes and data directly and continuing the data to be transmitted, it is easy to transmit data in the format as shown in FIG. 6 (3).

Figure 8:
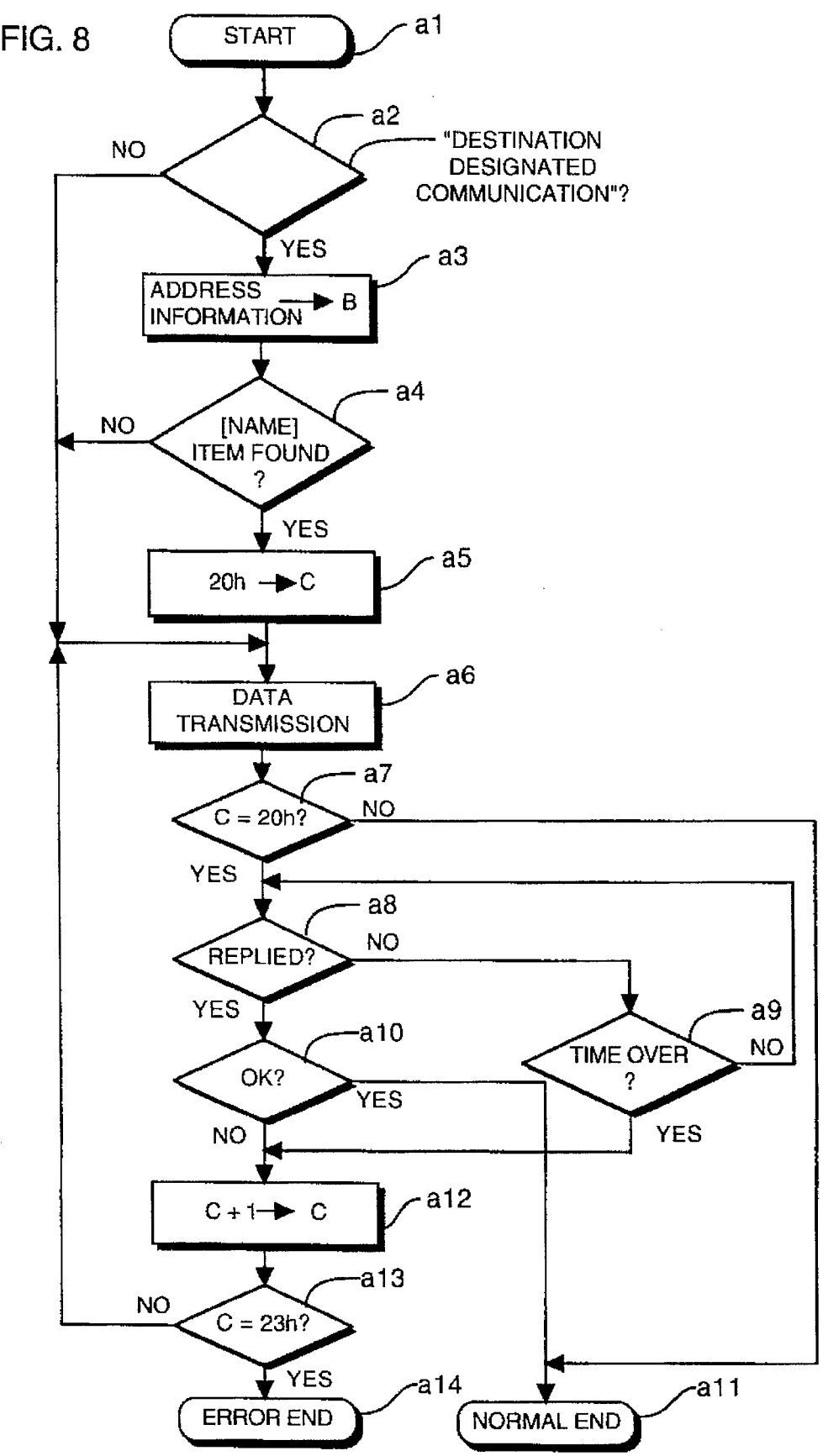
FIG. 8 is a flow chart showing transmitting operation in the embodiment shown in FIG. 1.

FIG. 8 shows operation for transmitting one case data. The operation starts from step a1. At this step, the code representing the transmission type selected in FIG. 4 (2) is already stored in variable A. Variables B and C are initialized with "00h". In the case of "wild communication", however, the variable C is initialized with "20h".

At step a2, depending on the value of the variable A, it is determined whether this is "destination designated communication" or not. In case the determination is "destination designated communication", the operation goes to step a3. At step a3, the address information entered from the states depicted in either FIG. 5 (1) or FIG. 5 (2) is stored in the variable B. At step a4, a check is made to determine whether the item of "name" exists in the destination address information. If it is found, it is determined to be 1:1 communication, and $20h$ is substituted in variable C at step a5.

If the determination at step a2 is not "destination designated communication" or after termination of the step a5, execution jumps to the data transmission at step a6. The data transmission is executed for one case of data specified by the variables A, B. When the data transmission is over, at step a7 it is checked whether the value of variable C is $20h$ or not. When the value of variable C is $20h$ (e.g. 1:1 communication) so that the operation goes to step a8 and step a9 to wait for a confirmatory reply. When a reply from the reception side apparatus is received, the result is judged at step a10, and in case of "OK", control operation ends normally at step a11. In case an "OK" reply is not received at step a10, at step a12 the value of the variable C is increased by one. At step a13, it is determined whether the value of the variable C is $23h$. When the value of the variable C is $23h$, the operation goes to step a14 and results in an error termination. When the value of the variable C is not $23h$, the operation returns to the step a6 and the data is transmitted again as retransmission process. When the reply waiting time is expired as indicated at the step a9, the value of the variable C is also increased by one at the step a12, and the re-transmission process is executed. This retransmission process is executed when the value of the valuable C as incremented at step a12 is determined to be less than $23h$, so that it is executed twice (i.e., when the variable C is increased from $20h$ to $21h$, and when increased from $21h$ to $22h$).

FIG. 9 shows operation at the reception side corresponding to the operation at the transmission side shown in FIG. 8. When the "reception" is selected in the state shown in FIG. 4 (1), the operation from step b1 is started. The variables A, B and C are cleared by entering the null code. At step b2 and step b3, the operation is to wait for data reception. If no data is received at step b2 within a specific time, a time out occurs at step b3. When data is received at the step b2, it is determined at step b4 whether or not a reception error occurs. The data is entered as a serial signal, and the format of the serial signal is judged to be an error in case a start bit and stop bit are not contained normally in every character. When individual characters are normal, an error occurs if the data format does not conform to the format shown in FIG. 6. If no reception error is detected, the operation goes to step b5, and then the transmission type is judged from the "TYPE" code shown in FIG. 6.

When the transmission type is judged to be "unconditional communication", the data is sequentially stored in the RAM 3 in FIG. 3 at step b6. At step b5, when the transmission type is judged to be "wild communication", the operation goes to step b7 whereat the data is stored, and the data representing the reply "OK" is sent to the transmission side at step b8.

When the transmission type is judged to be "destination designated communication" at the step b5, the operation goes to step b9, and then it is judged whether the address information coincides with the owner data or not. When the address information coincides, the data is stored at step b10, and it is judged at step b11 whether the item of "name" is included. If the item of "name" is found, the "OK" reply is sent at step b12.

After processing is over at the step b6, step b8, or step b12, the reception operation is terminated at step b13. Also when it is judged there is no item of "name" at the step b11, the processing is directly terminated at the step b13. Further, if at step b9, the owner data and the address information do not coincide with each other, the operation is terminated at step b13 without executing processes after the data store process at step b10. That is, only when the address information coincides with the processed data, is data stored in the RAM 3 and processed for reception. Only when the "wild communication" or "name" is designated, is the "OK" reply sent.

When a reception error is detected at step b4, operation goes to step b14, and the value of the variable A is increased by one. At step b15, it is judged whether the value of the variable A is $03h$ or not. When the value of the variable A is not $03h$, but, for example, $01h$ or $02h$, the operation goes to step b16. At step b16, the data representing "re-transmission request" is sent to the transmission side apparatus, and the re-transmission of the transmission data is requested. When a time out occurs at step b3, or when the value of the variable A is judged to be $03H$ at step the b15, the operation is terminated at step b17 as a communication error. That is, when data is not received within a specific time, or when it results in transmission error after twice re-transmittal of data, the operation is terminated as a communication error.

According to the illustrated embodiment, as a data communication device, an information tool like a so-called electronic pocket diary is used. In such information tool, personal data such as telephone directory and name card management is stored, and the destinations of data communication are mostly included in such data. The address information as destination address shown in FIG. 5 (2) can be available to at least a part of such personal data. Moreover, when the destination address information is entered in the state shown in FIG. 5 (2), an information input function as information tool can be utilized. As owner data for the reception side apparatus, the personal data already stored may be utilized. Needless to say, the partner of the data communication can be a larger apparatus such as a host computer.

For selection of destination, instead of the input of the destination name, the personal data from telephone directory, name card management, memo or the like already registered in the device may be selected, and this information may be transmitted as address information capable to select the destination. Further, on the display screen in FIG. 6, supposing to read out the personal data and to delete data of unnecessary item, it is possible to send out only the address of the specified items. At the reception side apparatus, first of all, the transmission type is checked in the received data, and only in the case of the "destination designated communication", the address information and owner data are compared, and the data reception is processed only when coincided, so that the secrecy of communication may be maintained.

In the foregoing embodiment, although data communication is performed by light such as infrared ray, data communication may be also performed by using radio wave, ultrasonic wave or the like. The various codes used in the communication and their order may be adoptively changed.

Furthermore, as electronic pocket diary system, even while executing data process other than data communication, when data is transmitted from other device, the operation at the reception side as shown in FIG. 9 may be executed. For example, by issuing an interruption signal from the optical communication device 6 or the I/O 4 to the CPU 1 shown in FIG. 1, the operation shown in FIG. 9 may be started up. Or, if the electronic pocket diary system is not in use, it may be kept waiting in low power consumption state, and when data is transmitted from other device, it may be changed over to the operation state as shown in FIG. 9.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A data communication apparatus comprising:

a communication unit for transmitting data in a transmission mode by wireless communication and for receiving data in a reception mode by wireless communication, a memory for storing data, an input device for entering data and data processing information, and a processor for processing the data stored in the memory and for activating the communication unit to transmit data in the transmission mode, the processor in the transmission mode being able to add at least a part of the data stored in the memory to a packet of information to be transmitted, the packet of information including either no restrictive destination data or restrictive destination data indicative of only one destination;

the processor in the reception mode executing a data receiving process to receive either a packet having no restrictive destination data or a packet having restrictive destination data indicative of a unique destination apparatus at which the processor resides;

wherein the processor causes display of the data stored in the memory by the display unit, according to the processing information entered in the input device, and making the data including the displayed data to be transmitted from the communication unit, and wherein the processor selects the destination data, according to the input entered into the input device, from the data displayed by the display unit.

2. The data communication apparatus of claim 1 in which the processor is provided with a reception confirmation function which, in data transmission, instructs a destination apparatus to reply with a confirmation signal informing of completion of reception, and awaits the confirmation signal, and in data reception, replies with the confirmation signal after completion of data reception when so instructed.

3. The data communication apparatus of claim 1 in which the communication unit performs the wireless communication using a light signal.

4. A wireless data communications apparatus which operates in a transmission mode and a reception mode, the apparatus including:

a processor;

a display output device driven by the processor;

a memory;

a data input device for entering input information including user data, a type code indicative of transmission type, and a plurality of records of address information for a corresponding plurality of other wireless data communication apparatus, the address information including a plurality of fields the plurality of fields including owner name;

the type code having a first value indicating whether a transmission is to be received by a plurality of the other wireless communication apparatus and a second value indicating that the transmission is to be received by only a single selected wireless communication apparatus identified as a selected recipient apparatus;

wherein the memory stores the input information entered via the data input device including the plurality of records;

means for designating the selected recipient apparatus;

wherein, during the transmission mode, the processor prepares a packet of information for transmission, the packet of information including the user data, the type code, and, when the type code so requires, address information for the selected recipient apparatus, the packet not having address information if not required by the type code;

a wireless transmitter for transmitting the packet during the transmission mode using electromagnetic energy;

a wireless receiver for receiving a received packet transmitted by another apparatus during the reception mode;

wherein the memory stores owner address information of the apparatus;

the display output device displaying, during the reception mode, user data included in the received packet;

wherein, during the reception mode, the processor decodes the received packet, determines the type code included in the received packet, and drives the output device to output the user data in the received packet in accordance with the type code included in the received packet;

the processor requiring, during the reception mode, a match of the address information for the selected recipient apparatus and the owner address information in order to drive the output device if the type code so requires.

5. The communications apparatus of claim 4, wherein the wireless transmission is optical transmission.

6. The communications apparatus of claim 4, wherein, if the type code so requires, upon reception of a packet, the processor prepares a confirmation message for transmission by the wireless transmitter.

7. Wireless data communications apparatus which operates in a transmission mode and a reception mode, the apparatus including:

a processor;

a display output device driven by the processor;

a memory;

a data input device for entering input information including user data, a type code indicative of transmission type, and a plurality of records of address information for a corresponding plurality of other wireless data communication apparatus;

the type code having a first value indicating whether a transmission is to be received by a plurality of the other wireless communication apparatus and a second value indicating that the transmission is to be received by only a single selected wireless communication apparatus identified as a selected recipient apparatus;

wherein the memory stores the input information entered via the data input device including the plurality of records;

means for designating the selected recipient apparatus;

wherein, during the transmission mode, the processor prepares a packet of information for transmission, the packet of information including the user data, the type code, and, when the type code so requires, address information for the selected recipient apparatus, the packet not having address information if not required by the type code;

a wireless transmitter for transmitting the packet during the transmission mode using electromagnetic energy;

a wireless receiver for receiving a received packet transmitted by another apparatus during the reception mode;

wherein the memory stores owner address information of the apparatus;

the display output device displaying, during the reception mode, user data included in the received packet;

wherein, during the reception mode, the processor decodes the received packet, determines the type code included in the received packet, and drives the output device to output the user data in the received packet in accordance with the type code included in the received packet;

the processor requiring, during the reception mode, a match of the address information for the selected recipient apparatus and the owner address information in order to drive the output device if the type code so requires; and wherein a first type code requires communication with a plurality of other wireless data communication apparatus, a second type code requires communication with a plurality of other wireless data communication apparatus and further requires return of a confirmation message; and a third type code requires communication with only wireless communication apparatus identified by the selected recipient apparatus.

8. The communications apparatus of claim 4, wherein, if the type code so requires, the after transmission of a packet the processor awaits receipt of a confirmation message, and wherein, if no confirmation message is received, the type code is modified and transmission of the packet is repeated.

9. The communications apparatus of claim 8, wherein, after transmission of a packet, the processor repetitively modifies the type code, retransmits the packet, and awaits receipt of a confirmation message, such repetitions occurring until the type code is modified to result in a predetermined termination quantity.

10. The communications apparatus of claim 9, wherein the type code is numerically stored, wherein modification of the type code is incrementation of the type code, and wherein modification of the type code absent receipt of the confirmation message occurs until the type code equals a predetermined termination number.

11. The communications apparatus of claim 4, wherein the display output device displays a menu by which the type code can be selected using the input device.

12. The communications apparatus of claim 4, wherein the display output device displays a menu by which a selected recipient apparatus is selected using the input device.

13. The communications apparatus of claim 4, wherein the display output device displays a menu by which a plurality of fields of the address information for a wireless data communication apparatus can be inputted using the input device.

14. A wireless data communications apparatus which operates in a transmission mode and a reception mode, the apparatus including:

a processor;

a display device driven by the processor to generate a plurality of displays including a plurality of menus, including a first menu for selecting a type code indicative of transmission type, a second menu for designating a selected recipient apparatus, and a third menu for entering/modifying address information for a selected recipient apparatus, the address information includes a plurality of fields, the plurality of fields including owner name, the type code indicating whether a transmission is to be received by a plurality of other wireless communication apparatus or instead only wireless communication apparatus identified by the selected recipient apparatus;

a data input device for entering input information including:
user data,
the type code entered in response to the first menu,
the selected recipient apparatus entered in response to the second menu,
the address information entered in response to the third menu, a memory for storing the input information entered via the data input device;

wherein, during the transmission mode, the processor prepares a packet of information for transmission, the packet of information including the user data, the type code, and, when the type code so requires, address information for the selected recipient apparatus, the packet not having address information if not required by the type code;

a wireless transmitter for transmitting the packet during the transmission mode using electromagnetic energy;

a wireless receiver for receiving a received packet transmitted by another apparatus during the reception mode;

wherein the memory stores owner address information of the apparatus;

the display device outputting, during the reception mode, user data included in the received packet as one of the plurality of displays;

wherein, during the reception mode, the processor decodes the received packet, determines the type code included in the received packet, and drives the display device to output the user data in the received packet in accordance with the type code included in the received packet;

the processor requiring, during the reception mode, a match of the address information for the selected recipient apparatus and the owner address information in order to drive the output device if the type code so requires.

15. The communications apparatus of claim 14, wherein the wireless transmission is optical transmission.

16. The communications apparatus of claim 14, wherein, if the type code so requires, upon reception of a packet, the processor prepares a confirmation message for transmission by the wireless transmitter.

17. A wireless data communications apparatus which operates in a transmission mode and a reception mode, the apparatus including:

a processor:

a display device driven by the processor to generate a plurality of displays including a plurality of menus, including a first menu for selecting a type code indicative of transmission type a second menu for designating a selected recipient apparatus, and a third menu for entering/modifying address information for a selected recipient apparatus, the type code indicating whether a transmission is to be received by a plurality of other wireless communication apparatus or instead only wireless communication apparatus identified by the selected recipient apparatus;

a data input device for entering input information including:

user data, the type code entered in response to the first menu, the selected recipient apparatus entered in response to the second menu, the address information entered in response to the third menu, a memory for storing the input information entered via the data input devise;

wherein during the transmission mode, the processor prepares a packet of information for transmission, the packet of information including the user data, the type code, and, when the type code so requires, address information for the selected recipient apparatus, the packet not having address information if not required by the type code;

a wireless transmitter for transmitting the packet during the transmission mode using electromagnetic energy;

a wireless receiver for receiving a received packet transmitted by another apparatus during the reception mode;

wherein the memory stores owner address information of the apparatus;

the display device outputting, during the reception mode, user data included in the received packet as one of the plurality of displays;

wherein, during the reception mode, the processor decodes the received packet, determines the type code included in the received packet, and drives the display device to output the user data in the received packet in accordance with the type code included in the received packets;

the processor requiring, during the reception mode, a match of the address information for the selected recipient apparatus and the owner address information in order to drive the output device if the type code so requires; and wherein a first type code requires communication with a plurality of other wireless data communication apparatus, a second type code requires communication with a plurality of other wireless data communication apparatus and further requires return of a confirmation message; and a third type code requires communication with only wireless communication apparatus identified by the selected recipient apparatus.

18. The communications apparatus of claim 17, wherein, if the type code so requires, the after transmission of a packet the processor awaits receipt of a confirmation message, and wherein, if no confirmation message is received, the type code is modified and transmission of the packet is repeated.

19. The communications apparatus of claim 18, wherein, after transmission of a packet, the processor repetitively modifies the type code, retransmits the packet, and awaits receipt of a confirmation message; such repetitions occurring until the type code is modified to result in a predetermined termination quantity.

20. The communications apparatus of claim 19, wherein the type code is numerically stored, wherein modification of the type code is incrementation of the type code, and wherein modification of the type code absent receipt of the confirmation message occurs until the type code equals a predetermined termination number.

21. A wireless data communications apparatus which includes:

a processor;

a wireless receiver for receiving a packet of information;

a memory for storing identifying information of the apparatus, the identifying information including a plurality of fields, the plurality of fields including owner name; and wherein the processor determines whether (1) a type code included in a received packet requires that the apparatus utilize the packet only if an address in the packet matches the identification information stored in the memory; and (2) whether the type code included in the received packet permits the apparatus to utilize the packet even if the packet does not include a memory address matching the identifying information stored in the memory.

22. The communications apparatus of claim 21, wherein the wireless transmission is optical transmission.

23. The communications apparatus of claim 21, further comprising a wireless transmitter and wherein, if the type code so requires, upon reception of a packet, the processor prepares a confirmation message for transmission by the wireless transmitter.

24. A wireless data communications apparatus which operates in a transmission mode and a reception mode, the apparatus including:

a processor, a display device driven by the processor to generate a plurality of menus, including:

a first menu for selecting a type code indicative of transmission type, a second menu for designating a selected recipient apparatus, the type code indicating whether a transmission is to be received by a plurality of other wireless communication apparatus or instead only wireless communication apparatus identified by the selected recipient apparatus;

a data input device for entering input information including:

user data, the the code entered in response to the first menu, the selected recipient apparatus entered in response to the second menu, the address information entered in response to the third menu, a memory for storing the input information entered via the data input device;

wherein, during the transmission mode, the processor prepares a packet of information for transmission, the packet of information including the user data, the type code, and, when the type code so requires, address information for the selected recipient apparatus, the packet not having address information if not required by the type code;

a wireless transmitter for transmitting the packet during the transmission mode using electromagnetic energy;

a wireless receiver for receiving a received packet transmitted by another apparatus during the reception mode;

wherein the memory stores identifying information of the apparatus, the identifying information including a plurality of fields, the plurality of fields including owner name;

the processing requiring, during the reception mode, a match of the address information for the selected recipient apparatus and the identifying information in order to utilize the packet if the type code so requires.

25. The communications apparatus of claim 24, wherein the wireless transmission is optical transmission.

26. The communications apparatus of claim 24, wherein, if the type code so requires, upon reception of a packet, the processor prepares a confirmation message for transmission by the wireless transmitter.

27. A wireless data communications apparatus which operates in a transmission mode and a reception mode, the apparatus including:

a processor, a display device driven by the processor to generate a plurality of menus, including:

a first menu for selecting a type code indicative of transmission type, a second menu for designating a selected recipient apparatus, type code indicating whether a transmission is to be received by a plurality of other wireless communication apparatus or instead only wireless communication apparatus identified by the selected recipient apparatus;

a data input device for entering input information including:

user data, the type code entered in response to the first menu, the selected recipient apparatus entered in response to the second menu, the address information entered in response to the third menu, a memory for storing the input information entered via the data input device;

wherein, during the transmission mode, the processor prepares a packet of information for transmission, the packet of information including the user data, the type code, and, when the type code so requires, address information for the selected recipient apparatus, the packet not having address information if not required by the type code;

a wireless transmitter for transmitting the packet during the transmission mode using electromagnetic energy;

a wireless receiver for receiving a received packet transmitted by another apparatus during the reception mode;

wherein the memory stores identifying information of the apparatus;

the processing requiring, during the reception mode, a match of the address information for the selected recipient apparatus and the identifying information in order to utilize the packet if the type code so requires, and a first type code requires communication with a plurality of other wireless data communication apparatus, a second type code requires communication with a plurality of other wireless data communication apparatus and further requires return of a confirmation message; and a third type code requires communication with only wireless communication apparatus identified by the selected recipient apparatus.

28. The communications apparatus of claim 24, wherein, if the type code so requires, the after transmission of a packet the processor awaits receipt of a confirmation message, and wherein, if no confirmation message is received, the type code is modified and transmission of the packet is repeated.

29. The communications apparatus of claim 18, wherein, after transmission of a packet, the processor repetitively modifies the type code, retransmits the packet, and awaits receipt of a confirmation message, such repetitions occurring until the type code is modified to result in a predetermined termination quantity.

30. The communications apparatus of claim 19, wherein the type code is numerically stored, wherein modification of the type code is incrementation of the type code, and wherein modification of the type code absent receipt of the confixation message occurs until the the code equals a predetermined termination number.

31. The communications apparatus of claim 24, wherein the display device displays a menu by which the type code can be selected using the input device.

32. The communications apparatus of claim 24, wherein the display device displays a menu by which a selected recipient apparatus is selected using the input device.

33. The communications apparatus of claim 24, wherein the display device displays a menu by which a plurality of fields of the address information for a wireless data communication apparatus can be inputted using the input device.

34. The communications apparatus of claim 7, wherein the wireless transmission is optical transmission.

35. The communications apparatus of claim 7, wherein, if the type code so requires, upon reception of a packet, the processor prepares a confirmation message for transmission by the wireless transmitter.

36. The communications apparatus of claim 7, wherein, if the type code so requires, the after transmission of a packet the processor awaits receipt of a confirmation message, and wherein, if no confirmation message is received, the type code is modified and transmission of the packet is repeated.

37. The communications apparatus of claim 36, wherein, after transmission of a packet, the processor repetitively modifies the type code, retransmits the packet, and awaits receipt of a confirmation message, such repetitions occurring until the type code is modified to result in a predetermined termination quantity.

38. The communications apparatus of claim 37, wherein the type code is numerically stored, wherein modification of the type code is incrementation of the type code, and wherein modification of the type code absent receipt of the confirmation message occurs until the type code equals a predetermined termination number.

39. The communications apparatus of claim 7, wherein the output device comprises a display device driven by the processor, and wherein the display device displays a menu by which the type code can be selected using the input device.

40. The communications apparatus of claim 7, wherein the output device comprises a display device driven by the processor, and wherein the display device displays a menu by which a selected recipient apparatus is selected using the input device.

41. The communications apparatus of claim 7, wherein the output device comprises a display device driven by the processor, and wherein the display device displays a menu by which a plurality of fields of the address information for a wireless data communication apparatus can be inputted using the input device.

42. The communications apparatus of claim 17, wherein the wireless transmission is optical transmission.

43. The communications apparatus of claim 17, wherein, if the type code so requires, upon reception of a packet, the processor prepares a confirmation message for transmission by the wireless transmitter.

44. The communications apparatus of claim 27, wherein the wireless transmission is optical transmission.

45. The communications apparatus of claim 27, wherein, if the type code so requires, upon reception of a packet, the processor prepares a confirmation message for transmission by the wireless transmitter.

46. The communications apparatus of claim 27, wherein, if the type code so requires, after transmission of a packet the processor awaits receipt of a confirmation message, and wherein, if no confirmation message is received, the type code is modified and transmission of the packet is repeated.

47. The communications apparatus of claim 27, wherein the display device displays a menu by which the type code can be selected using the input device.

48. The communications apparatus of claim 27, wherein the display device displays a menu by which a selected recipient apparatus is selected using the input device.

49. The communications apparatus of claim 27, wherein the display device displays a menu by which a plurality of fields of the address information for a wireless data communication apparatus can be inputted using the input device.

* * * * *